(12) United States Patent
Mantell et al.

(10) Patent No.: US 8,960,839 B1
(45) Date of Patent: Feb. 24, 2015

(54) SYSTEM AND METHOD FOR SPATIAL DEPENDENT CORRECTION FOR IMAGES PRINTED WITH MULTIPLE DROP PARAMETERS

(71) Applicant: Xerox Corporation, Norwalk, CT (US)

(72) Inventors: David A. Mantell, Rochester, NY (US); Howard A. Mizes, Pittsford, NY (US); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/277,524

(22) Filed: May 14, 2014

(51) Int. Cl.
*B41J 2/205* (2006.01)
*B41J 2/21* (2006.01)

(52) U.S. Cl.
CPC ..................... *B41J 2/2132* (2013.01)
USPC .......................................................... 347/15

(58) Field of Classification Search
CPC .......... B41J 29/39; B41J 2/205; B41J 2/2142; B41J 2/2056; G01J 3/52; G01J 3/46; H04N 1/6033; H04N 1/60; H04N 1/00002; H04N 1/6055; H04N 1/32256; H04N 1/4051; H04N 1/00015
USPC .......................................... 347/14, 15, 19, 43
See application file for complete search history.

(56) References Cited

U.S. PATENT DOCUMENTS

| 5,347,374 | A | 9/1994 | Fuss et al. |
|---|---|---|---|
| 5,777,656 | A | 7/1998 | Henderson |
| 5,847,724 | A | 12/1998 | Mantell |
| 5,975,671 | A | 11/1999 | Spaulding et al. |
| 6,736,478 | B2 | 5/2004 | Franzke et al. |
| 6,806,980 | B2 | 10/2004 | Xu et al. |
| 6,883,892 | B2 | 4/2005 | Sievert et al. |
| 7,023,578 | B2 | 4/2006 | Hayes et al. |
| 7,073,883 | B2 | 7/2006 | Billow |
| 7,255,417 | B2 | 8/2007 | Yamazaki et al. |
| 7,374,266 | B2 | 5/2008 | Walmsley et al. |
| 7,380,898 | B2 | 6/2008 | Plante et al. |
| 7,597,418 | B2 | 10/2009 | Mantell et al. |
| 7,639,392 | B2 * | 12/2009 | Li et al. ........................... 358/1.9 |
| 7,880,930 | B2 | 2/2011 | Zhang et al. |
| 8,118,391 | B2 | 2/2012 | Snyder et al. |
| 8,437,040 | B2 | 5/2013 | Taylor et al. |
| 2003/0210926 | A1 | 11/2003 | Regimbal et al. |
| 2005/0083364 | A1 | 4/2005 | Billow |
| 2006/0098251 | A1 | 5/2006 | Eklund et al. |
| 2006/0285134 | A1 | 12/2006 | Viturro et al. |
| 2009/0027433 | A1 | 1/2009 | Van De Wynckel et al. |

\* cited by examiner

*Primary Examiner* — Thinh Nguyen
(74) *Attorney, Agent, or Firm* — Maginot Moore & Beck LLP

(57) ABSTRACT

A method of operating a printer includes identifying a halftone level a first ink drop parameter corresponding to a contone level in image data for using a contone to halftone mapping. The method includes operating printheads to form a printed pattern using the first ink drop parameter and identifying a reflectance level of the printed pattern in scanned image data. The method includes modifying the halftone level in the mapping if the identified reflectance level is outside of a tolerance range from a normalized reflectance value associated with the contone level and storing the modified halftone level in a memory for printing the contone level.

19 Claims, 5 Drawing Sheets

SYSTEM AND METHOD FOR SPATIAL DEPENDENT CORRECTION FOR IMAGES PRINTED WITH MULTIPLE DROP PARAMETERS

TECHNICAL FIELD

The system and method disclosed in this document relates to inkjet printing systems generally, and, more particularly, to systems and methods for adjusting the operation of inkjets to form printed images with uniform perceptible densities.

BACKGROUND

Inkjet printers eject patterns of ink drops to form both single and multicolor printed images. In an inkjet printer, one or more printheads eject drops of ink onto an image receiving surface, such as paper or an indirect image receiving member, and the patterns of individual ink drops give the appearance of text, graphics, and other images. Combinations of multiple ink colors, such as cyan, magenta, yellow, and black (CMYK) inks, can form a wide range of perceptible colors in a printed image.

Many modern inkjet printers receive digital data corresponding to a printed image. The digital data for a printed image often include data corresponding to printed colors that are encoded in a continuous tone (contone) format. In a contone format, a single two-dimensional location in the image, which is referred to as a contone pixel, can have a wide range of colors that are formed from different intensity levels of basic colors such as red, green, blue (RGB) colors. In other embodiments, the colors of contone pixels are encoded in a device independent color space such as the $L^*a^*b^*$ color space or other color spaces known to the art. Video display devices often reproduce colors using contone pixels. Inkjet printers, however, produce images from patterns of ink drops using a comparatively small number of inks in a halftone output that includes a pattern of printed ink drops. For example, the color of a single pixel of contone image data may be reproduced using a pattern of multiple separate ink drops that reproduce the contone color on a physical print medium. The physical properties of the ink drops affect the perceptible intensity of printed ink colors since the ink drops spread on the image receiving surface and generally have circular shapes instead of the square shapes associated with contone pixels.

Inkjet printers employ tone reproduction curves (TRCs) to convert image data that are provided in the contone formats to values such that when the values are halftoned, the printed ink patterns provide an accurate reproductions of the original contone images. For example, a set of gray contone pixels with a relative level of 50% between pure-black (100% level) and pure-white (0% level) generates a halftone pattern with half of the pixels being assigned a black ink drop and the other half of the pixels being left blank, which corresponds to white when printing on white paper. Because the ink drops spread on the image receiving surface, however, printing the direct halftone pattern produces a printed image that is darker than the intended 50% level in one printer configuration. A digital controller in the printer uses the TRC to generate modified contone image data that includes adjustments for the intensity levels of some or all of the contone pixels in the original digital image data. For example, in one configuration a TRC reduces a contone pixel levels from 50% to 40%. The printer then uses halftone processes that are known to the art to convert the modified contone image data into patterns of image data corresponding to printed ink drops that form the printed image.

Some inkjet printers are capable of printing with ink drops of different sizes or using a range of inks that have different colorant concentrations within the same image. The TRC's for images that are printed using a combination of different ink drop sizes or different colorant concentrations are hard to calibrate and can show uneven or inaccurate halftone printed images. Existing techniques to correct the image uniformity that ignore the multiple drop sizes may not be robust to noises produced by these multiple drop sizes and may not give optimal uniformity. Consequently, improved systems and methods for controlling halftone printing using multiple ink drop sizes or colorant concentration levels to enable accurate color reproduction would be beneficial.

SUMMARY

In one embodiment, a method of operating an inkjet printer to form printed patterns with uniform perceptible density using multiple ink drop parameters has been developed. The method includes identifying with a controller a first halftone level corresponding to a contone level for a first ink drop parameter in a plurality of ink drop parameters with reference to at least one mapping between a plurality of contone levels and a first plurality of halftone levels corresponding to the first ink drop parameter stored in a memory, operating at least one printhead to eject ink drops with at least the first ink drop parameter to form a printed pattern on an image receiving surface, the at least one printhead being operated with reference to the first halftone level to form the printed pattern corresponding to the contone level, generating with an optical sensor first scanned image data corresponding to the printed pattern on the image receiving surface, identifying with the controller a first reflectance level of the printed pattern in the first scanned image data, modifying with the controller the first halftone level in the at least one mapping in response to the first reflectance level being different than a predetermined reflectance level stored in the memory in association with the contone level, and storing with the controller the modified first halftone level in the at least one mapping in the memory to enable printing of halftone patterns with the predetermined reflectance level.

In another embodiment, an inkjet printer that is configured to form printed patterns with uniform perceptible density using multiple ink drop parameters has been developed. The inkjet printer includes at least one printhead configured to form printed patterns on an image receiving surface, an optical sensor configured to generate scanned image data of printed patterns on the image receiving surface, and a controller operatively connected to the at least one printhead, the optical scanner, and a memory. The controller is configured to identify a first halftone level corresponding to a contone level for a first ink drop parameter with reference to at least one mapping between a plurality of contone levels and a first plurality of halftone levels corresponding to the first ink drop parameter stored in the memory, operate the at least one printhead to eject ink drops with the first ink drop parameter to form a printed pattern on the image receiving surface, the at least one printhead being operated with reference to the first halftone level to form the printed pattern corresponding to the contone level, generate first scanned image data corresponding to the printed pattern on the image receiving surface with the optical sensor, identify a first reflectance level of the printed pattern in the first scanned image data, modify the first halftone level in the at least one mapping in response to the first reflectance level being different than a predetermined reflectance level stored in the memory in association with the contone level, and store the modified first halftone level in the at least one mapping in the memory to enable printing of halftone patterns with the predetermined reflectance level.

BRIEF DESCRIPTION OF THE DRAWINGS

An embodiment of this application is described, by way of example, with reference to the accompanying drawings, in which like reference numerals refer to like elements, and in which:

FIG. 1 is a block diagram of a process for

DETAILED DESCRIPTION

Figure 1:
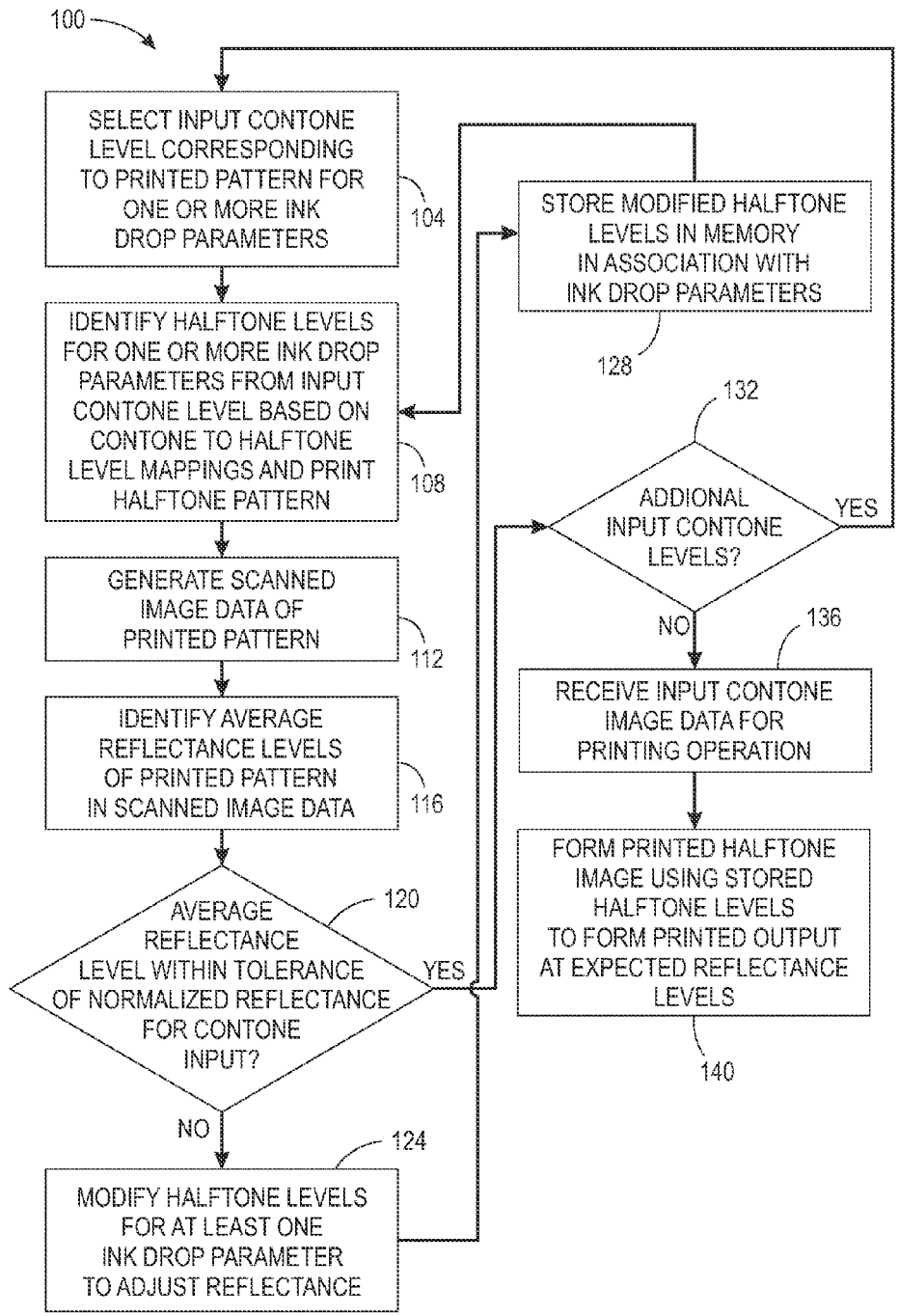

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with colorants on media, such as digital copiers, bookmaking machines, facsimile machines, multi-function machines, and the like. As used herein, the term "process direction" refers to a direction of movement of a print medium, such as a continuous media web pulled from a roll of paper or other suitable print medium along a media path through a printer. A media transport in the printer uses one or more actuators, such as electric motors, to move the print medium past one or more printheads in the print zone to receive ink images and passes other printer components, such as heaters, fusers, pressure rollers, and on-sheet optical imaging sensors, that are arranged along the media path. As used herein, the term "cross-process" direction refers to an axis that is perpendicular to the process direction along the surface of the print medium.

As used herein, the term "ink drop parameter" refers to a physical parameter of an ink drop that affects the visibility of the ink drop when the ink drop is deposited onto a print medium either directly or after a transfer from an indirect image receiving member. One ink drop parameter refers to a concentration of a colorant in the ink drop. For example, some inks include a colorant that is formed in a liquid carrier such as water or a solvent. The perceived intensity of the ink drop of a fixed size on the print medium corresponds to the concentration of the colorant in the ink drop, with the intensity increasing as the concentration of the colorant increases.

Another ink drop parameter is a size of the ink drop that is deposited on the print medium. In an inkjet printer, the sizes of the ink drops that are ejected from one or more printheads in the printer are affected by the electrical firing signals that are used to operate the inkjets to eject the ink drops. As used herein, the term "firing signal" refers to an electrical signal that is generated to operate an actuator, such as a piezoelectric or thermal actuator, in an inkjet to eject a drop of ink from the inkjet. As described in more detail below, the parameters of the firing signal, including the amplitude and duration of the signal, affect the size of an ink drop that the inkjet ejects during operation.

In one inkjet printer embodiment, a single inkjet or group of inkjets in a printhead eject ink drops over a range of sizes in response to different electrical firing signals. In another embodiment, two or more printheads are arranged along the process direction and each printhead ejects ink drops of different sizes. In another embodiment, an inkjet ejects a single ink drop to form a smaller ink drop size on the print medium and the inkjet ejects multiple ink drops in rapid succession that combine on the print medium to form a mark that is similar to a single larger ink drop. In still another embodiment the print medium passes through a print zone two or more times and a single inkjet or multiple inkjets in the print zone eject ink drops onto a single location of the print medium during multiple passes to affect the size of the printed ink drop in the printed document. As used herein, any reference to an ink drop size parameter refers to any method for depositing different amounts of ink or colorant on the print medium to increase or decrease the visibility of the printed mark.

The use of multiple ink drop sizes enables the printer to form printed images with reduced graininess in low-density regions of printed images while also forming fully-saturated regions in high-density regions of the printed image. The smaller ink drop sizes in the low-density regions reduce the appearance of graininess because for a fixed average print density the larger number of smaller drops gives less local density variations than a smaller number of larger drops. The larger ink drops in the high-density regions of the printed image fully saturate the print medium to form vivid colors where the underlying print medium is completely covered with ink.

As used herein, the terms "contone to halftone mapping" or more simply "mapping" are used interchangeably and refer to a conversion between a contone image data parameter for a pixel of contone image data to one or more halftone levels. The contone image data are often generated through a color-space conversion process and application of a tone-reproduction curve (TRC) prior to reaching the mapping process that converts contone pixel values to halftone levels. In one embodiment, the mapping is a lookup table (LUT) that is stored in a memory of a printer where an input contone level is associated with output contone levels for a plurality of ink drop parameters that are used in the printer, or multiple mappings associate input contone levels with the individual halftone levels for the different ink drop parameters.

As used herein, the term "contone level" refers to a value, set of values, or coordinates that are assigned to a pixel of contone image data that indicates the intensity of the pixel in either a device independent color space, such as L*a*b*, or in a device dependent color space such as a CMYK colorspace in a printer. In one embodiment, the contone values are expressed as percentages or numeric values for each color component that forms the contone value, while in another embodiment the contone levels is expressed with a predetermined numeric scale such as a scale of 0 to 255 in an 8-bit embodiment.

As used herein, the term "halftone level" refers to a relative proportion of an area of the image receiving surface that receives ink drops to form a color with a selected perceptible density corresponding to the contone image data. The halftone levels are, for example, percentages from 0% to 100% that describe the density of ink drops for each ink drop parameter in the printer in a halftone pattern that corresponds to the contone pixel. In one embodiment, 0% indicates that a particular ink drop parameter is not used in the halftone pattern, 100% indicates that a maximum predetermined density of ink drops for the ink drop parameter are used to form the halftone pattern, and an intermediate percentages specify a range of intermediate densities for the ink drop parameter in the halftone pattern. The halftone levels are used as part of a further half-toning process that generates different patterns of printed ink drops for generation of a printed image that reproduces digital contone image data. In alternative embodiments the halftone levels are expressed numerically on a scale, such as 0-255 for 8-bit halftone levels. As is known in the art, a single pixel of contone image data is often reproduced using two or more ink drops in a halftoned ink drop pattern. In an inkjet that operates using multiple ink drop parameters, some halftoned patterns include a pattern of ink drops using one of the ink drop parameters while other halftoned patterns ink drops that are selected using multiple ink drop parameters.

In a printer, the input contone level to halftone level mappings are implemented with one or more lookup tables (LUTs) that are stored in a memory or are generated using one or more equations with coefficients and other parameters that are stored in the memory. As described in more detail below, in a printer that uses multiple ink drop parameters to form printed images, the printer memory stores a mapping for each ink drop parameter. Some color printer embodiments store separate mappings corresponding to the ink drop parameters for each of the color separations, such as cyan, magenta, yellow, and black colors, in the memory. As depicted below, mappings between the full range of input contone levels and output contone levels are often illustrated as curves.

Figure 5:
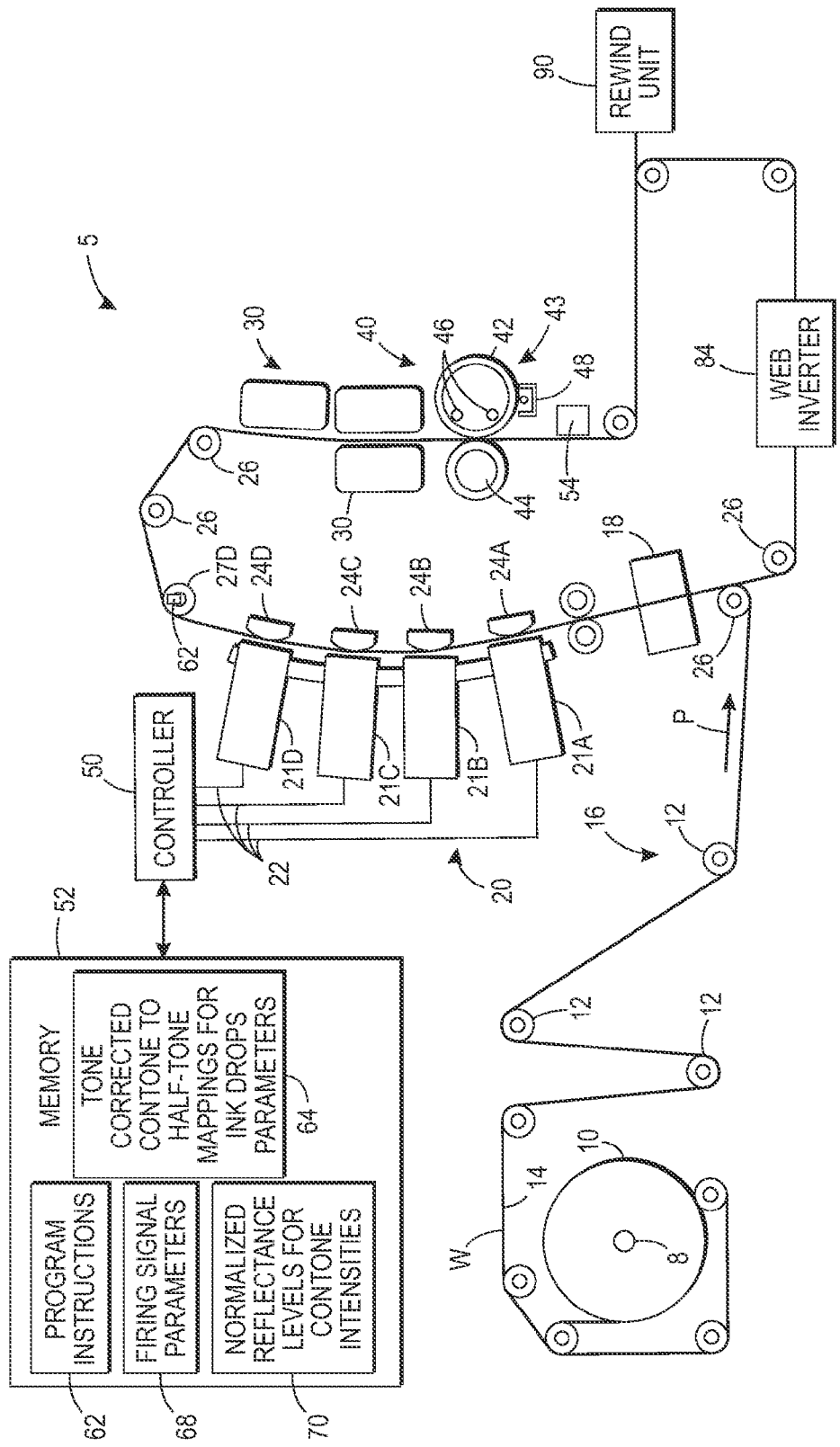
FIG. 5 is a graph depicting an inkjet printer that is configured to adjust the operation of inkjets in one or more printheads to form printed halftone images that correspond to a range of contone levels using multiple ink drop parameters.

FIG. 5 is a simplified schematic view of the direct-to-sheet, continuous-media, phase-change inkjet printer 5, that is configured to generate test patterns using a plurality of printheads positioned in a print zone in the printer. A media supply and handling system is configured to supply a long (i.e., substantially continuous) web of media 14 of "substrate" (paper, plastic, or other printable material) from a media source, such as a spool of media 10 mounted on a web roller 8. For simplex printing, the printer includes the web roller 8, media conditioner 16, print zone or printing station 20, and rewind unit 90. For duplex operations, the web inverter 84 is used to flip the web to present a second side of the media to the printing station 20 before being taken up by the rewind unit 90. In the simplex operation, the media source 10 has a width that substantially covers the width of the rollers 12 and 26 over which the media travels through the printer. In duplex operation, the media source is approximately one-half of the roller widths as the web travels over one-half of the rollers in the printing station 20 before being flipped by the inverter 84 and laterally displaced by a distance that enables the web to travel over the other half of the rollers opposite the printing station 20 for the printing and conditioning, if necessary, of the reverse side of the web. The rewind unit 90 is configured to wind the web onto a roller for removal from the printer and subsequent processing.

The media can be unwound from the source 10 as needed and propelled by a variety of motors, not shown, rotating one or more rollers. The media conditioner includes rollers 12 and a pre-heater 18. The rollers 12 control the tension of the unwinding media as the media moves along a path through the printer. In alternative embodiments, the media can be transported along the path in cut sheet form in which case the media supply and handling system can include any suitable device or structure that enables the transport of cut media sheets along an expected path through the imaging device. The pre-heater 18 brings the web to an initial predetermined temperature that is selected for desired image characteristics corresponding to the type of media being printed as well as the type, colors, and number of inks being used. The pre-heater 18 can use contact, radiant, conductive, or convective heat to bring the media to a target preheat temperature, which in one practical embodiment, is in a range of about 30° C. to about 70° C.

The media are transported through a printing station 20 that includes a series of color units 21A, 21B, 21C, and 21D, each color unit effectively extending across the width of the media and being able to place ink directly (i.e., without use of an intermediate or offset member) onto the moving media. The controller 50 is operatively connected to the color units 21A-21D through control lines 22. Each of the color units 21A-21D includes a plurality of printheads positioned in a staggered arrangement in the cross-process direction over the media web 14. As is generally familiar, each of the printheads can eject a single color of ink, one for each of the colors typically used in four color printing, namely, cyan, magenta, yellow, and black (CMYK). The controller 50 of the printer receives velocity data from encoders mounted proximately to rollers positioned on either side of the portion of the path opposite the four printheads to compute the position of the web as moves past the printheads. The controller 50 uses these data to generate timing signals for actuating the inkjets in the printheads to enable the four colors to be ejected with a reliable degree of accuracy for registration of the differently color patterns to form four primary-color images on the media. The inkjets actuated by the firing signals correspond to image data processed by the controller 50. The image data can be transmitted to the printer, generated by a scanner (not shown) that is a component of the printer, or otherwise electronically or optically generated and delivered to the printer. In various alternative embodiments, the printer 5 includes a different number of color units and can print inks having colors other than CMYK.

In the printer 5, each of the printhead units 21A-21D includes one or more printhead controllers that generate electrical firing signals to control the operation of the inkjets in each of the printheads. In the printer 5, the printheads are configured to eject three different sizes of ink drops in response to three different electrical firing signal waveforms. As described in more detail below, the controller 50 is further configured to adjust the peak amplitudes of the firing signal waveforms to further increase or decrease the sizes of the small, intermediate, and large sized ink drops to adjust the perceptible intensity of printed patterns and enable the printer 5 to produce printed patterns with a continuous range of perceptible densities.

In the illustrative embodiment of FIG. 5, the printer 5 uses four different colors of "phase-change ink," by which is meant that the ink is substantially solid at room temperature and substantially liquid when heated to a phase change ink melting temperature for jetting onto the imaging receiving surface. The phase change ink melting temperature can be any temperature that is capable of melting solid phase change ink into liquid or molten form. In one embodiment, the phase change ink melting temperature is approximately 70° C. to 140° C. In alternative embodiments, the ink utilized in the imaging device can comprise UV curable gel ink. Gel ink can also be heated before being ejected by the inkjets of the printhead. Alternative embodiments of the printer 5 use aqueous inks that are liquid at room temperature. As used herein, liquid ink refers to melted solid ink, heated gel ink, or other known forms of ink, such as aqueous inks, ink emulsions, ink suspensions, ink solutions, or the like.

Associated with each of color units 21A-21D is a corresponding backing member 24A-24D, respectively. The backing members 24A-24D are typically in the form of a bar or roll, which is arranged substantially opposite the printhead on the back side of the media. Each backing member is used to position the media at a predetermined distance from the printhead opposite the backing member. In the embodiment of FIG. 5, each backing member includes a heater that emits thermal energy to heat the media to a predetermined temperature which, in one practical embodiment, is in a range of about 40° C. to about 60° C. The various backer members can be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media web 14 moves to receive inks of various colors from the printheads of the print zone 20, the printer 5 maintains the temperature of the media web within a given range. The printheads in the color units 21A-21D eject ink at a temperature typically significantly higher than the temperature of the media web 14. Consequently, the ink heats the media. Therefore, other temperature regulating devices may be employed to maintain the media temperature within a predetermined range. For example, the air temperature and air flow rate behind and in front of the media may also impact the media temperature. Accordingly, air blowers or fans can be utilized to facilitate control of the media temperature. Thus, the printer 5 maintains the temperature of the media web 14 within an appropriate range for the jetting of all inks from the printheads of the print zone 20. Temperature sensors (not shown) can be positioned along this portion of the media path to enable regulation of the media temperature.

Following the print zone 20 along the media path, the media web 14 moves over guide rollers 26 to one or more "mid-heaters" 30. A mid-heater 30 can use contact, radiant, conductive, and/or convective heat to control a temperature of the media. Depending on the temperature of ink and paper at rollers 26, this "mid-heater" can add or remove heat from the paper and/or ink. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 applies heat and/or pressure to the media to fix the images to the media. The fixing assembly 40 includes any suitable device or apparatus for fixing images to the media including heated or unheated pressure rollers, radiant heaters, heat lamps, and the like. In the embodiment of FIG. 5, the fixing assembly includes a "spreader" 43, that applies a predetermined pressure, and in some implementations, heat, to the media. The function of the spreader 40 is to take what are essentially droplets, strings of droplets, or lines of ink on web 14 and smear them out by pressure and, in some systems, heat, so that spaces between adjacent drops are filled and image solids become uniform. In addition to spreading the ink, the spreader 40 also improves image permanence by increasing ink layer cohesion and/or increasing the ink-web adhesion. The spreader 43 includes rollers, such as image-side roller 42 and pressure roller 44, to apply heat and pressure to the media. Either roll can include heat elements, such as heating elements 46, to bring the web 14 to a temperature in a range from about 35° C. to about 80° C. In alternative embodiments, the fixing assembly can be configured to spread the ink using non-contact heating (without pressure) of the media after the print zone. Such a non-contact fixing assembly uses any suitable type of heater to heat the media to a desired temperature, such as a radiant heater, UV heating lamps, and the like. In another printer embodiment that employs aqueous ink, the fixing assembly 40 does not include a spreader, such as the spreader 40, but includes one or more heaters that dry aqueous ink on the media web after the media web passes through the print zone 20. In a UV ink printer embodiment, the fixing assembly 40 includes UV light sources that direct UV radiation at the ink to cross-link and fix the ink to the surface of the media web.

In one practical embodiment, the roller temperature in spreader 40 is maintained at an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi lbs/side.

The spreader 40 also includes a cleaning/oiling station 48 associated with image-side roller 42. The station 48 cleans and/or applies a layer of some release agent or other material to the roller surface. In the printer 5, the release agent material is an amino silicone oil having viscosity of about 10-200 centipoises. Only small amounts of oil are required and the oil carried by the media is only about 1-10 mg per A4 size page. In one possible embodiment, the mid-heater 30 and spreader 40 can be combined into a single unit, with their respective functions occurring relative to the same portion of media simultaneously. In another embodiment the media is maintained at a high temperature during the printing operation to enable the spreader 40 to spread the ink while the ink is in a liquid or semi-liquid state.

Following passage through the spreader 40 the printed media can be wound onto a roller for removal from the system (simplex printing) or directed to the web inverter 84 for inversion and displacement to another section of the rollers for a second pass by the printheads, mid-heaters, and spreader. The duplex printed material is subsequently wound onto a roller for removal from the system by rewind unit 90. Alternatively, additional processing stations receive the print medium and perform tasks such as cutting, binding, collating, and/or stapling the media or the like.

Operation and control of the various subsystems, components and functions of the printer 5 are performed with the aid of the controller 50. The controller 50 is implemented with general or specialized programmable processors that execute programmed instructions. The instructions and data required to perform the programmed functions are stored in a memory 52 that is operatively connected to the controller 50. The memory 52 includes volatile data storage devices such as random access memory (RAM) and non-volatile data storage devices including magnetic and optical disks or solid state storage devices. The processors, their memories, and interface circuitry configure the controllers and/or print engine to perform the functions, such as the difference minimization function, described above. These components are provided on a printed circuit card or provided as a circuit in an application specific integrated circuit (ASIC). In one embodiment, each of the circuits is implemented with a separate processor device. Alternatively, the circuits can be implemented with discrete components or circuits provided in VLSI circuits. Also, the circuits described herein can be implemented with a combination of processors, ASICs, discrete components, or VLSI circuits.

As described in more detail below, the controller 50 executes stored program instructions 62 in the memory 52 to form printed patterns on the media web 14 and to identify the reflectance levels of the printed patterns for use in correcting tone reproduction curves or modifying firing signal waveform parameters to enable the printer 5 to form printed patterns with a uniform ink density across the page. The memory 52 also stores one or more input contone level to output contone level mappings 64. The mappings 64 correspond to adjustments that are made to input contone image data for the different ink drop parameters that are used in the printer 5. In the printer 5, the memory 52 stores input contone level to output contone level mappings for two or more ink drop parameters that are associated with each of the cyan, magenta, yellow, and black inks for the color units 21A-21D. The memory 52 also stores firing signal parameter data 68 that are associated with two or more ink drop sizes that the color units 21A-21D use to form printed images. As describe below, the controller 50 modifies the firing signal parameters to increase or decrease the ink drop sizes for the ink drop parameters. An increase or decrease in the ink drop size increases or decreases, respectively, the perceptible density of a halftone pattern. The memory 52 also stores one or more curves corresponding to average normalized reflectance levels 70. In one embodiment, the normalized reflectance level data 70 include an average reflectance level for all of the printheads in each of the color units 21A-21D over a range of contone levels. The absolute reflectance level can vary due to changes in ink formulation and the optical properties of the different media webs, but the normalized reflectance levels are a reference to use in calibrating the ink drop parameters in multiple inkjets in a single printhead and between multiple printheads. The calibration between multiple inkjets that eject ink drops onto different regions of the media web is referred to as a spatially dependent calibration because the inkjets are spatially separated from each other in the print zone. Once calibrated, the multiple inkjets and printhead eject ink drops that form halftone printed patterns with uniform perceptible densities across the surface of the media web for a given contone input level. As described below, the printer 5 is configured to adjust the waveform parameters for the electrical firing signals at different contone levels to produce printed patterns using multiple ink drop sizes that have average reflectance levels that correspond to the predetermined normalized reflectance levels 70 to enable printing patterns with a continuous range of perceptible density levels using multiple ink drop sizes.

The printer 5 includes an optical sensor 54 that is configured to generate image data corresponding to the media web 14. The optical sensor is configured to generate signals indicative of reflectance levels of the media, ink, or backer roll opposite the sensor to enable detection of, for example, the presence and/or location of ink drops jetted onto the receiving member by the inkjets of the printhead assembly. The optical sensor 54 includes an array of optical detectors mounted to a bar or other longitudinal structure that extends across the width of an imaging area on the image receiving member.

In one embodiment in which the imaging area is approximately twenty inches wide in the cross-process direction and the printheads print at a resolution of 600 dpi in the cross-process direction, over 12,000 optical detectors are arrayed in a single row along the bar to generate a single scanline of image data corresponding to a line across the image receiving member. The optical detectors are configured in association in one or more light sources that direct light towards the surface of the image receiving member. The optical detectors receive the light generated by the light sources after the light is reflected from the image receiving member, such as the media web 14. The magnitude of the electrical signal generated by an optical detector corresponds to the amount of light reflected into the detector from the surface of the media web 14, including bare portions of the media web surface and portions that carry printed ink patterns. The magnitudes of the electrical signals generated by the optical detectors are converted to digital values by an appropriate analog/digital converter.

FIG. 1 depicts a process 100 for modifying contone to halftone mappings for one or more ink drop parameters in an inkjet printer to reduce or eliminate discontinuities in the visual intensity of printed images when the printer forms printed images using multiple ink drop parameters. In the discussion below, a reference to the process 100 performing a function or action refers to the operation of a controller that executes stored program instructions to perform the function or action in conjunction with one or more components in the printer. Process 100 is described in conjunction with the printer 5 of FIG. 5 and the contone to halftone mapping curves of FIG. 3.

Process 100 begins as the controller 50 selects an input contone level for reproduction as a halftoned printed image (block 104). In one embodiment of the printer 5, a predetermined test pattern includes contone image data corresponding to multiple contone image levels that are printed during the process 100 to identify the density of different halftone test patches. In one embodiment the controller 50 receives image data including a set of patches for different contone levels that cover a range of contone levels that the printer 5 generates during printing operations. For example, the contone image data patches are selected at 10% intervals ranging from the lowest contone level up to the maximum contone level. Each patch of the test pattern image data corresponds to a single contone level that the printer 5 reproduces as a halftone printed image. In the embodiment of printer 5, the controller 50 uses a color space conversion process, such as an international color consortium (ICC) profile, and a tone reproduction curve (TRC) to modify the input contone level from a device independent color space for use with the device-specific characteristics of the printer 5. The printer 5 subsequently generates a halftone printed pattern based on the modified contone input data.

Process 100 continues as the printer 5 identifies halftone levels for one or more of the ink drop parameters from the input contone level and generates a halftoned printed pattern on the media web 14 using the identified halftone levels (block 108). In the printer 100, the controller 50 identifies halftone levels for the individual ink drop parameters the input contone level data using the contone to halftone mapping data 64. In some embodiments, the contone to halftone mapping data 64 are stored as one or more LUTs in the memory 52. In some embodiments, the LUTs 64 do not include an individual entry for every contone input level and halftone output level. Instead, the controller 50 applies an interpolation process to identify the halftone levels for the ink drop parameters that are associated with each input contone level from an interpolation of two or more entries in each of the LUTs. The controller 50 performs the halftone process with the identified halftone levels to generate drop image data that control the operation of one or more printheads in the color units 21A-21D to form a printed halftone pattern on the media web 14. The portion of the halftoning process that occurs after the controller 50 identifies the halftone levels for each of the ink drop parameters corresponding to the input contone level is well known to the art and is not discussed in further detail.

Figure 3:
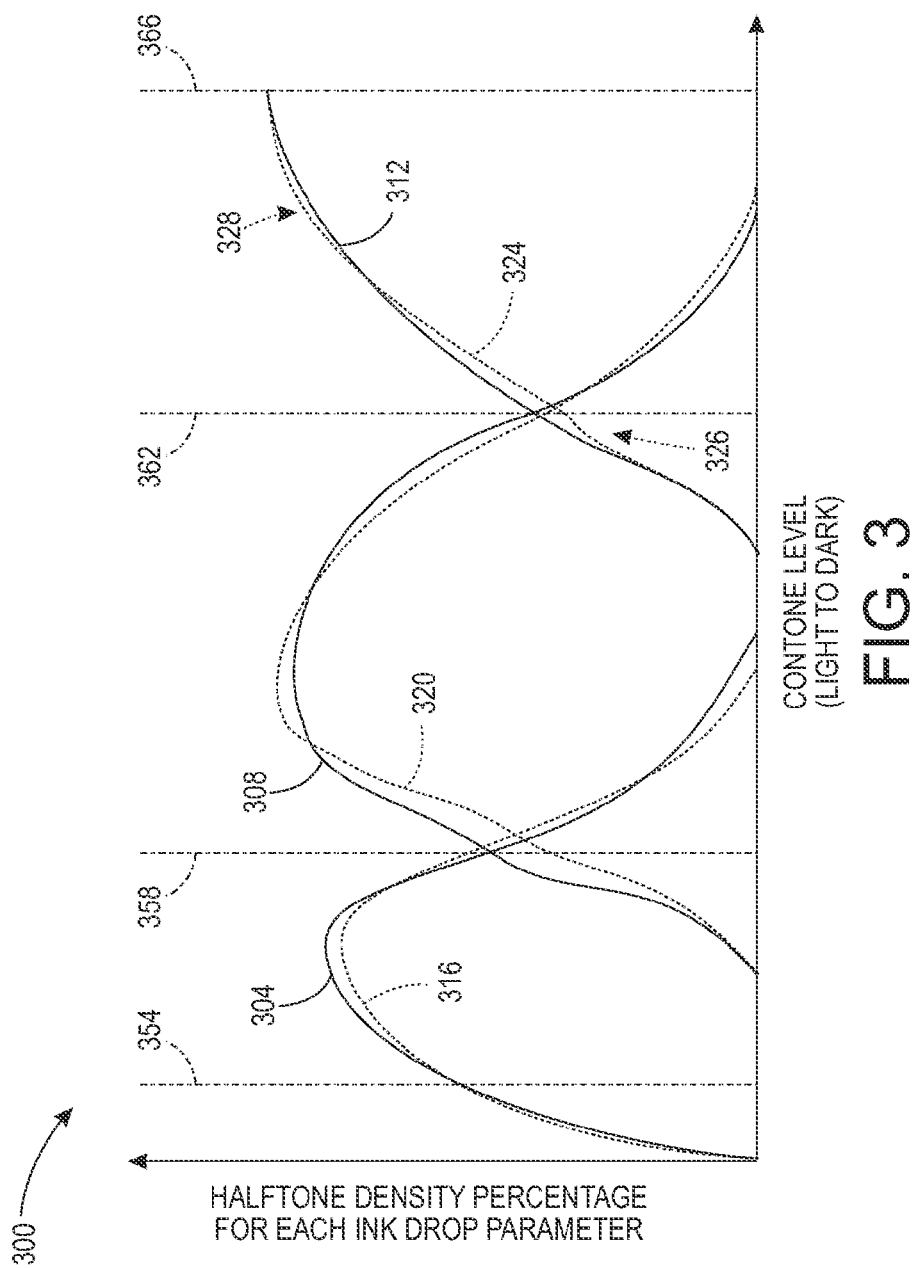
FIG. 3 is a graph depicting the relative proportions of different ink drop parameters that are used to form halftone printed patterns that correspond to a range of contone input levels.

FIG. 3 depicts a graphical representation of the mappings 64 that the control 50 uses to identify halftone output levels for multiple ink drop parameters based on an input contone level. In FIG. 3, the plots 304, 308, and 312 depict the selected halftone levels for a first, second, and third ink drop parameter, respectively, in response to a single contone level input. In one embodiment, the ink drop parameters 304-312 represent small, medium, and large sized ink drops, respectively, while in another embodiment the ink drop parameters 304-312 represent low, medium, and high colorant concentrations inks, respectively. Some input contone levels are reproduced using a halftone pattern that includes only a single ink drop parameter. For example, the low intensity contone level at reference 354 is reproduced using only the selective percentage level of the ink drop parameter 304, and the high intensity contone level at reference 366 is reproduced using only the ink drop parameter 366. The controller 50 generates halftone patterns for other contone input levels using a mixture of two or more of the ink drop parameters. For example, at reference 358 the controller 50 generates a halftone pattern using the identified halftone levels for both the parameters 304 and 308, and at the contone level for reference 362 the controller 50 generates the printed halftone pattern using the identified halftone levels for both the parameters 308 and 312 in the halftone printing process.

Referring again to FIG. 1, process 100 continues as the printer 5 generates scanned image data of the printed region on the media web 14 that includes the printed halftone pattern (block 112). In the printer 5, the optical sensor 54 generates scanned image data of the region of the media web 14 that includes the printed halftone test pattern.

The controller 50 identifies an average reflectance level for the region of the media web 14 that includes the printed halftone pattern (block 116). The scanned image data include individual pixels that correspond to regions of low reflectance (e.g. a printed ink drop on the media web 14) and high reflectance (e.g. a bare region of the media web 15). The printed halftone patterns included different combinations of high and low reflectance regions based upon the density of printed ink that the printer 5 forms on the media web 14, and the average reflectance level for scanned image data pixels over a region the media web 14 correspond to the perceptible density of the printed halftone pattern. The normalized reflectance levels correspond to a predetermined curve of average reflectance levels for the printed patterns over the range of contone levels that produce a continuous perceptible intensity response for printed ink patterns. In one embodiment, the normalized reflectance levels are determined empirically for the printer 5 and predetermined associations between one or more contone levels and the corresponding normalized reflectance levels are stored in the memory 52. The printer 5 stores the predetermined normalized reflectance level data 70 in the memory 52 to identify the expected normalized reflectance levels from a halftone printed pattern that is generated for a particular contone input.

If the controller 50 identifies that the average reflectance level for the printed halftone pattern is within a predetermined tolerance range of a predetermined normalized reflectance level that is expected to be produced for reproduction of the original contone input (block 120), then the process 100 continues for any additional input contone levels (block 132) and the printer 5 processes additional contone image data to form printed halftone patterns corresponding to the range of input contone levels as described above with reference to the processing of blocks 104-116.

If the controller 50 identifies that the average reflectance level for the printed halftone pattern falls outside of the predetermined tolerance range of the predetermined normalized reflectance level (block 120), then the controller 50 modifies the halftone level corresponding to the input contone level for at least one of the ink drop parameters (block 124). In one embodiment, the halftone levels for at least one of the ink drop parameters are increased when the measured average reflectance level is above the expected normalized reflectance level, and the halftone levels for at least one of the ink drop parameters decreased when the measured average reflectance level is below the expected normalized reflectance level.

FIG. 3 depicts modifications to the mappings between contone inputs and the halftone levels associated with each of the ink drop parameters. In FIG. 3, the printer 5 initially uses the curves 304, 308, and 312 for three different ink drop parameters that form halftone printed images. During the process 100, the controller 50 generates modifies curves 316, 320, and 324 based on the measured average reflectance levels of halftone printed patterns. As depicted in FIG. 3, the modified curves 316-324 generate different halftone output levels for a given contone input level. During process 100, the printer 5 generates an output halftone image using the halftone levels for the ink drop parameters 308 and 312 to generate a halftone output that corresponds to the input contone level at reference 362. If the identified reflectance level for the printed halftone pattern is below the predetermined tolerance range, then the controller 50 reduces the halftone levels for one or both of the ink drop parameters 308 and 312 as part of modifying the contone to halftone level mappings for modified ink drop parameter curves 320 and 324, respectively. In another example at reference 358, the controller 50 increases the halftone level in the curve 316 for the first ink drop parameter but reduces the halftone level in the curve 320 for the second ink drop parameter. In still another example at reference 354, the modified curve 316 has the same reflectance level as the original curve 304 for situations where the average reflectance level of the printed halftone pattern is within the tolerance range of the predetermined normalized reflectance level for the contone input.

During process 100, the controller 50 is configured to modify different portions of the halftone mappings for each ink drop parameter based on the different input contone levels. In the illustrative example of FIG. 3, the contone to halftone level mapping that is depicted by the curves 312 and 324 for the third ink drop parameter includes both a portion 326 in the curve 324 that is below the halftone levels in the original curve 312 and another portion 328 that is above the halftone levels in the original curve 312. In an embodiment where the printer 5 stores the mappings for contone to halftone levels as a LUT for each of the ink drop parameters, the controller 50 selectively increases or decreases the halftone level entry that corresponds to different contone input level entries to generate new mappings with reference to the average reflectance levels that are identified during the process 100.

To modify the mappings for one or more of the ink drop parameters, the controller 50 increases or decreases the halftone levels for one or more of the ink drop parameters that are used to form the printed halftone pattern. Increasing the halftone levels for the ink drop parameters reduces the reflectivity level of a corresponding printed pattern for the input contone level and decreasing the halftone levels increases the reflectivity level of the corresponding printed pattern for the input contone level. In the process 100, the printer 5 optionally modifies the contone to halftone mappings in an incremental manner and then prints additional halftone patterns for a single contone level to modify the halftone mappings in an iterative manner. Thus, in some instances where two or more ink drop parameters are used to form the halftone printed pattern, the controller 50 changes only one halftone level for one of the ink drop parameters or increases the halftone level for one ink drop parameter while reducing the halftone level in the mapping for the other ink drop parameter. The changes to the halftone level for only a single ink drop parameter simplify the identification of changes to the average reflectivity of the halftone printed pattern in a subsequent iteration of the process 100.

The controller 50 optionally increases the halftone level in the mapping for one ink drop parameter while decreasing the halftone level in the mapping for another ink drop parameter to fine-tune the final reflectance level for the halftone patterns that are formed by both ink drop parameters. For example, in one embodiment the controller 50 adjusts the mapping for a larger ink drop size to increase the halftone level for printed patterns, which produces a corresponding decrease in the reflectivity level. The controller 50 also reduces the halftone level in the mapping for a smaller ink drop size that has a lower overall impact on the reflectance level of the printed pattern to slightly increase the reflectivity and prevent an over-correction that may occur due to the increase in the halftone level for the larger ink drop size.

During process 100, the controller 50 stores the modified halftone levels in the halftone mappings for one or more of the ink drop parameters in the memory 52 (block 128). In the illustrative embodiment of FIG. 1, the processing of blocks 108-128 continues in an iterative manner until the average reflectance level of the printed halftone patterns is within the predetermined tolerance from the stored normalized reflectance curves 70 that correspond to the range of input contone levels for the printer 5.

After processing each of the input contone levels that are used to characterize the halftone output of the printer 5 (block 132), the process 100 continues during a printing operation during which the printer 5 receives contone image data (block 136) and forms halftone printed images using the modified contone to halftone level mappings for each of the ink drop parameters (block 140). The controller 50 uses the modified contone to halftone level mappings to generate printed images that include a uniform range of perceptual densities that correspond to the predetermined normalized reflectance level curves.

The printer 5 and many other printing system embodiments include multiple inkjets that are arranged in one or more printheads in the process direction across a print zone. The process 100 is performed for multiple groups of inkjets in each of the printheads and between the multiple printheads in the printer 5 to identify the ink drop parameters that produce halftone printed patterns with the appropriate reflectance levels for each group of inkjets. In some embodiments, the ink drop parameters are set for all of the inkjets in a single printhead, while in other embodiments the printhead controllers can set ink drop parameters for individual inkjets or groups of inkjet in a printhead. Because the different groups of inkjets and printheads print onto different portions of the media web, the process 100 optionally generates different sets of the mappings that are depicted in FIG. 3 for different groups of inkjets or for different printheads. Thus, the process 100 identifies ink drop parameters for different inkjets and printheads in a spatially dependent manner to enable spatially separated inkjets in the printer to form halftone patterns with a uniform perceptible density for a given contone input level. In one embodiment, the printer performs the process 100 in parallel for multiple groups of inkjets and printheads in the printer.

Figure 2:
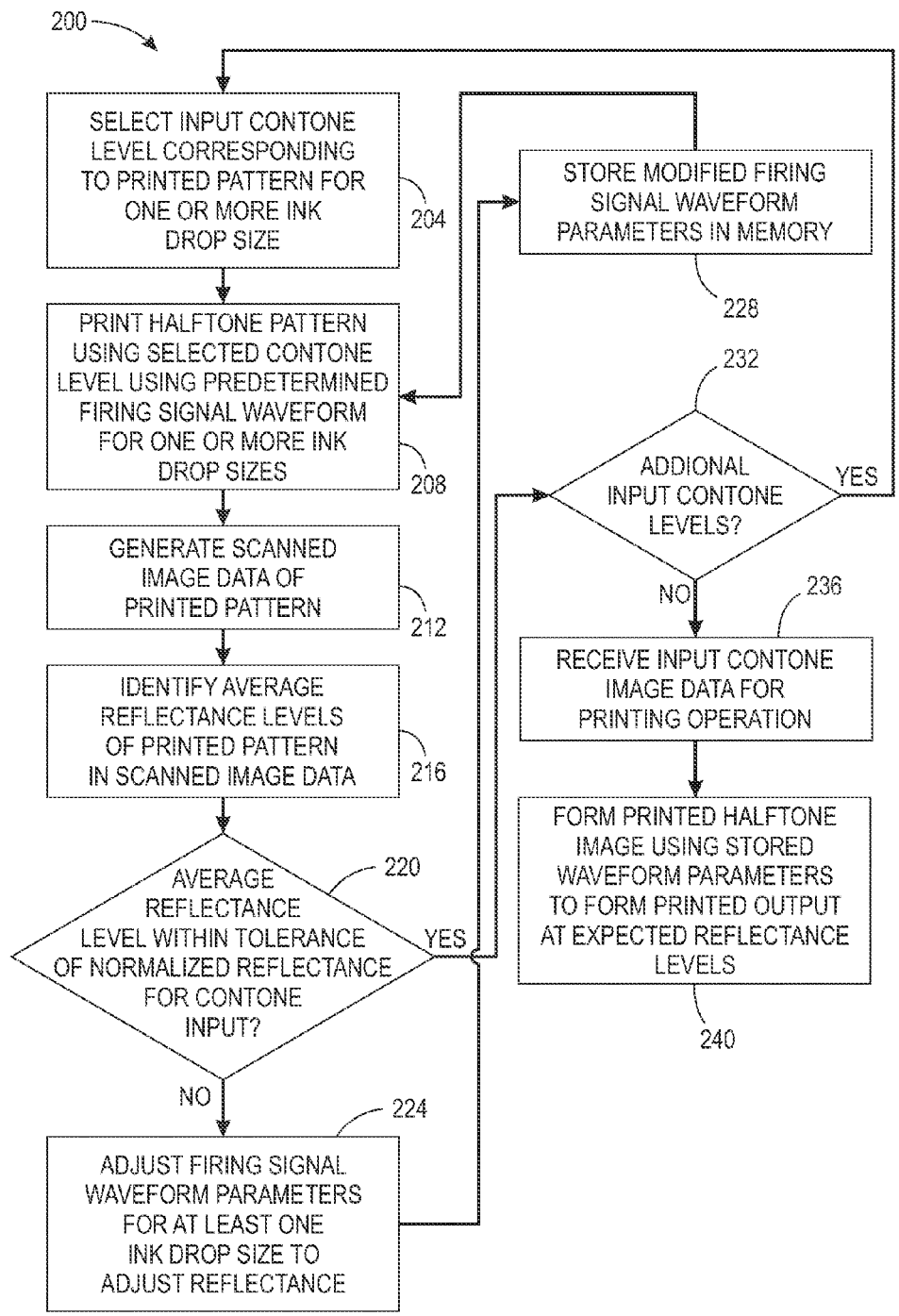
FIG. 2 is a block diagram of a process for modifying the electrical signals for one or more inkjets in a printer to enable printing halftone patterns that correspond to a range of contone levels in a printing process.

FIG. 2 depicts a process 200 for adjusting the sizes of ink drops that are used for printing halftone patterns to adjust the perceptible intensity of the printed patterns used in a printing operation. In the illustrative embodiment of FIG. 2, the process 200 does not change the halftone patterns, but instead adjusts the sizes of ink drops that are used for one or more halftone patterns to adjust the perceptible intensity and reflectance level of the printed pattern and enable reproduction of a continuous range of printed densities using two or more ink sizes of ink drop in an inkjet printer. In the discussion below, a reference to the process 200 performing a function or action refers to the operation of a controller that executes stored program instructions to perform the function or action in conjunction with one or more components in the printer. Process 200 is described in conjunction with the electrical signal waveform graphs of FIG. 4 and the printer 5 of FIG. 5 for illustrative purposes.

Process 200 begins with selection of a contone level that corresponds to a halftone pattern that is formed using one or more ink drop sizes (block 204). In the printer 5, the controller 50 selects a contone level that corresponds to a halftone pattern that includes one size of ink drops or multiple sizes of ink drops. The printer 5 forms a printed halftone pattern corresponding to the selected contone level using one or more of the inkjets in the color units 21A-21D to eject ink drops with one or more drop sizes onto the media web 14 (block 208). In one embodiment, the printer 5 generates two or more electrical firing signals to operate a single inkjet that forms a printed pattern with multiple ink drop sizes. In another embodiment, one inkjet in the print zone 20 ejects one size of ink drops and a second inkjet that is located in a similar cross-process direction location ejects another size of ink drops to form the halftone pattern. In another embodiment, the printer 5 operates multiple inkjets in a single printhead or multiple inkjets in two or more printheads to form a larger printed pattern using the selected halftone pattern.

To form the printed patterns using ink drops of different sizes, the controller 50 sends image drop data corresponding to the halftone printed image to electronic printhead controllers in the color units 21A-21D. The electronic printhead controllers in the color units 21A-21D generate electrical firing signals that activate individual inkjets to eject ink drops onto the media web 14 in response to the image data from the controller 50. In the printer 5, each firing signal includes a positive peak voltage followed by a negative peak voltage for a predetermined duration. In general, the size of an ink drop is proportional to the amplitude of the positive and negative voltage peaks of the firing signal and to the duration of the firing signal.

Figure 4:
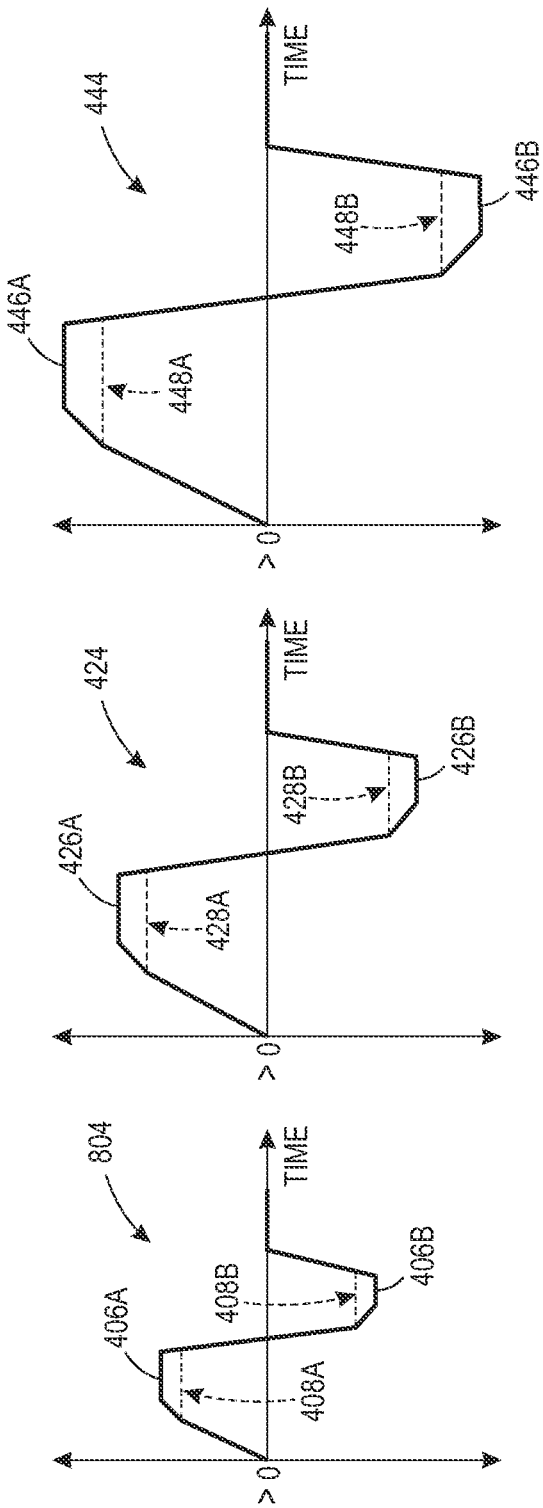
FIG. 4 is a graph depicting electrical signal waveforms for three different sizes of ink drops.

FIG. 4 depicts illustrative electrical firing signal waveforms 404, 424, and 444 that are generated to eject three different sizes of ink drop from inkjets in the printer 5. In FIG. 4, the waveform 404 includes positive and negative voltage peaks 406A and 406B, respectively, for ejecting ink drops of a low mass, which correspond to ink drop with a small size. As described in more detail below, the peaks 406A and 406B depict maximum positive and negative voltage levels, respectively, for ejecting the low mass ink drops. The printhead controllers are configured to adjust the amplitude of the peaks over a series of increments between predetermined minimum voltage peak amplitudes 408A and 408B and the corresponding maximum peak amplitudes 406A and 406B. In FIG. 4, the waveforms 424 and 444 depict firing signal waveforms that are used for ejecting ink drops of an intermediate mass and of a large mass, respectively. The firing signal 424 is generated with a positive voltage peak from a maximum level 426A to a minimum level 428A and a negative voltage peak from maximum negative amplitude 426B to minimum negative amplitude 428B. The firing signal 428 is generated with a positive voltage peak from a maximum level 446A to a minimum level 448A and a negative voltage peak from maximum negative amplitude 446B to minimum negative amplitude 448B.

Referring again to FIG. 2, process 200 continues with generation of scanned image data of the printed pattern (block 212). In the printer 5, the optical sensor 54 generates scanned image data including measured reflectance levels from printed pattern on the media web 14. In the printer 5, the controller 50 identifies an average reflectance level of printed pattern on the media web 14 (block 216). The printer 5 performs the processing described in the blocks 212 and 216 in the same manner as described with reference to the processing of the blocks 112 and 116, respectively, of FIG. 1.

During process 200, the controller compares the measured reflectance level of the printed pattern to a predetermined normalized reflectance level corresponding to the original contone level of the printed pattern. In the printer 5, the memory 52 stores the normalized reflectance level data 70 that associates the average reflectance levels corresponding to a uniform range of perceptible ink densities with a range of contone levels. Some halftone ink patterns that include multiple sizes of ink drops may introduce discontinuities into the perceptible intensity of printed patterns. The normalized reflectance levels correspond to a predetermined curve of average reflectance levels for the printed patterns over the range of contone levels that produce a continuous perceptible intensity response for printed ink patterns. In one embodiment, the normalized reflectance levels are determined empirically for the printer 5 and predetermined associations between one or more contone levels and the corresponding normalized reflectance levels are stored in the memory 52.

During the process 200, if the measured average reflectance level is within a predetermined tolerance range with the predetermined normalized reflectance level corresponding to the contone level (block 220), then the process 200 continues for any additional input contone levels (block 232) and the printer 5 processes additional contone image data to form printed halftone patterns corresponding to the range of input contone levels as described above with reference to the processing of blocks 204-216.

During the process 200, if the measured average reflectance level differs from the predetermined normalized reflectance level corresponding to the contone level by more than a predetermined tolerance range, (block 220), then the controller 50 adjusts parameters in one or more of the firing signal waveforms to adjust the sizes of ink drops that are ejected to form the halftone pattern (block 224). To change the ink drop size, the controller 50 increases or decreases the peak positive and negative voltage amplitudes for the firing signal waveforms within an operating range for each waveform. For example, using the waveform 404 in FIG. 4 as an example, the controller 50 increases the peak amplitude levels toward the maximum amplitude levels 406A and 406B to increase the size of the ejected ink drops and decrease the corresponding average reflectance levels of printed patterns that are formed with the ink drops. In another embodiment, the controller 50 increases the duration in time of the firing signal to increase the ink drop size in addition to or instead of increasing the amplitude levels. The controller 50 decreases the peak amplitude toward the minimum peak amplitude levels 408A and 408B to decrease the size of the ejected ink drops and increase the corresponding average reflectance levels of the printed patterns that are formed with the ink drops. In another embodiment, the controller 50 decreases the duration in time of the firing signal to decrease the ink drop size in addition to or instead of decreasing the amplitude levels. In process 200, the printer 5 uses the modified waveform parameters to form a new printed halftone pattern as described above with reference to the processing of blocks 208-224 to modify the firing signal parameters in an iterative manner until the average reflectance level of the printed patterns corresponds to the predetermined normalized reflectance level.

In printed patterns that include multiple sizes of ink drops, the controller 50 adjusts the firing signal waveform parameter for one or more of the firing signal waveforms, such as the firing signal waveforms 404, 424, and 444 corresponding to small, intermediate, and large sized ink drop sizes, respectively, in FIG. 4. The adjustment of a firing signal waveform parameter for one of the multiple sizes of ink drops modifies the average reflectance level of the printed pattern at any original contone level that contains this size of ink drop.

In one embodiment, a calibration process that is performed prior to the process 200 produces a predetermined waveform adjustment sensitivity matrix. We can also figure out the sensitivity on the fly by making adjustments and observing the response. One embodiment, the predetermined waveform adjustment sensitivity matrix processing is described as $D_g = MD_W$ where $D_g$ is a vector including the number of distinct gray levels that are measured as changes to the gray data in response to modifying an ink drop parameter (e.g. an 8×1 vector in one embodiment), $D_W$ is another vector corresponding to a change in waveform parameter for each type of waveform (e.g. a 3×1 vector for a printer with three ink drop sizes), and M is matrix that corresponds to a sensitivity between the change in reflectance level and changes in waveform parameter. One technique to generate the waveform adjustment sensitivity matrix includes identifying changes in the gray level reflectance values for each of the ink drop parameters individually to determined M. The controller 50 uses the value of the matrix M with the changes in reflectance values that are measured in the vector $D_g$ to identify the vector $D_W$.

For each original contone level of the printed pattern and each size of ink drop, the element of the waveform adjustment sensitivity matrix is given by the ratio of the change in the average reflectance level of the printed pattern to the change in the firing signal waveform parameter. The optimal adjustment of each firing signal waveform parameter is defined by the adjustments that minimize the differences between the measured reflectance level of the printed pattern and the normalized reflectance for each contone level. From the predetermined waveform adjustment sensitivity matrix and from the difference between the measured reflectance level of the printed pattern and the normalized reflectance level, the optimal adjustments of each firing signal waveform parameter can be determined. In another embodiment, the controller 50 generates the waveform adjustment sensitivity matrix during process 200 by first using a default initial waveform adjustment sensitivity matrix, and subsequently refining the waveform adjustment sensitivity matrix based on the response of the measured reflectance level of the printed pattern to the adjustment of the waveform firing parameters.

In printed patterns that include multiple sizes of ink drops, the controller 50 adjusts the peak amplitudes for one or more of the firing signal waveforms, such as the firing signal waveforms 404, 424, and 444 corresponding to small, intermediate, and large sized ink drops in FIG. 4. In one embodiment, the controller 50 modifies the firing signal waveform amplitudes for the smallest ink drop size that is used for the halftone pattern until the amplitude reaches a maximum or minimum operational peak amplitude level. The controller 50 then modifies the peak amplitude parameters of the larger ink drop sizes until the printed pattern has an average reflectance level that is within a predetermined range of the predetermined normalized reflectance level. In another embodiment, the controller 50 modifies the peak amplitude levels for each of the ink drop sizes that are used to form the printed pattern.

During process 200, the controller 50 stores the modified parameters for one or more of the firing signal waveforms with the firing signal parameter data 68 in the memory 52 for use in printing operations (block 228). In one embodiment, the process 200 is repeated for multiple contone levels. In one embodiment, the printer 5 identifies a single set of firing signal parameters for each of the ink drop sizes that enables accurate reproduction of the printed patterns corresponding to a wide range of contone levels. In another embodiment, the printer 5 generates different firing signal parameters for one or more of the ink drop sizes for different contone levels. The firing signal waveforms that are used for different ink drop sizes can vary between different contone levels to enable the printer 5 to form the printed halftone patterns with the predetermined average reflectance levels.

After processing each of the input contone levels that are used to characterize the halftone output of the printer 5 (block 232), the process 200 continues during a printing operation during which the printer 5 receives contone image data (block 236) and forms halftone printed images using the firing signals with the modified firing signal parameters (block 240). The controller 50 uses the modified contone to halftone level mappings to generate printed images that include a uniform range of perceptual densities that correspond to the predetermined normalized reflectance level curves.

The printer performs the process 200 for multiple groups of inkjets or multiple printheads in the print zone in a spatially dependent manner similar to the process 100. In some embodiments, the printer identifies firing signal waveform parameters for individual inkjets in a printhead, while in other embodiments a single printhead operates each of the inkjets using a single set of firing signal waveform parameters. During process 200, the printer optionally identifies different firing signal waveform parameters for different sets of inkjets and printheads to enable spatially separated groups of inkjets to form the halftone printed patterns with uniform perceptible density for a given contone level. In one embodiment, the printer performs the process 200 in parallel for multiple groups of inkjets and printheads in the printer.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of operating an inkjet printer comprising:
    identifying with a controller a first halftone level corresponding to a contone level for a first ink drop parameter in a plurality of ink drop parameters with reference to at least one mapping between a plurality of contone levels and a first plurality of halftone levels corresponding to the first ink drop parameter stored in a memory;
    operating at least one printhead to eject ink drops with at least the first ink drop parameter to form a printed pattern on an image receiving surface, the at least one printhead being operated with reference to the first halftone level to form the printed pattern corresponding to the contone level;
    generating with an optical sensor first scanned image data corresponding to the printed pattern on the image receiving surface;
    identifying with the controller a first reflectance level of the printed pattern in the first scanned image data;
    modifying with the controller the first halftone level in the at least one mapping in response to the first reflectance level being different than a predetermined reflectance level stored in the memory in association with the contone level; and
    storing with the controller the modified first halftone level in the at least one mapping in the memory to enable printing of halftone patterns with the predetermined reflectance level.

2. The method of claim 1 further comprising:
    identifying with the controller a second halftone level corresponding to the input contone level for a second ink drop parameter in the plurality of ink drop parameters with reference to the at least one mapping between the plurality of contone levels and a second plurality of halftone levels corresponding to the second ink drop parameter stored in the memory;
    operating the at least one printhead to eject ink drops with the second ink drop parameter to form the printed pattern on the image receiving surface, the at least one printhead being operated with reference to the second halftone level to form the printed pattern corresponding to the contone level;
    modifying with the controller the second halftone level in the at least one mapping in response to the first reflectance level being different than the predetermined reflectance level stored in the memory in association with the contone level; and
    storing with the controller the modified second halftone level in the at least one mapping in the memory to enable printing of halftone patterns with the predetermined reflectance level.

3. The method of claim 2 wherein the first ink drop parameter corresponds to a first ink drop mass and the second ink drop parameter corresponds to a second ink drop mass.

4. The method of claim 2 wherein the first ink drop parameter corresponds to a first ink colorant concentration and the second ink drop parameter corresponds to a second ink colorant concentration.

5. The method of claim 1 the modification of the halftone level further comprising:
    increasing with the controller the first halftone level in response to the first reflectance level being above the predetermined reflectance level.

6. The method of claim 1 the modification of the halftone level further comprising:
    decreasing with the controller the first halftone level in response to the first reflectance level being below the predetermined reflectance level.

7. A method of operating an inkjet printer comprising:
    generating with a controller a halftone pattern including ink drops of a first ink drop parameter in a plurality of ink drop parameters for a contone level;
    operating a plurality of inkjets in at least one printhead to eject ink drops with at least the first ink drop parameter to form a printed pattern on an image receiving surface with reference to the halftone pattern, each ink drop with the first ink drop parameter being ejected from one of the plurality of inkjets in response to a first firing signal corresponding to the first ink drop parameter;

generating with an optical sensor first scanned image data corresponding to the printed pattern on the image receiving surface;

identifying with the controller a first reflectance level of the printed pattern in the first scanned image data;

modifying a parameter of the first firing signal in response to the first reflectance level being different than the predetermined reflectance level stored in the memory in association with the contone level; and storing with the controller the modified parameter for the first firing signal in the memory to enable printing of halftone patterns with the predetermined reflectance level.

8. The method of claim 7 further comprising:

generating with the controller the halftone pattern including ink drops of a second ink drop parameter for the contone level;

operating the plurality of inkjets in the at least one printhead to eject ink drops with the second ink drop parameter to form the printed pattern on the image receiving surface with reference to the halftone pattern, each ink drop with the second ink drop parameter being ejected from one of the plurality of inkjets in response to a second firing signal corresponding to the second ink drop parameter;

modifying a parameter of the second firing signal in response to the first reflectance level being different than the predetermined reflectance level stored in the memory in association with the contone level; and storing with the controller the modified parameter for the second firing signal in the memory to enable printing of halftone patterns with the predetermined reflectance level.

9. The method of claim 8 wherein the parameter of the first firing signal corresponds to an amplitude of the first firing signal.

10. The method of claim 9, the modification of the parameter further comprising:

increasing with the controller the amplitude of the first firing signal in response to the first reflectance level being above the predetermined reflectance level.

11. The method of claim 9, the modification of the parameter further comprising:

decreasing with the controller the amplitude of the first firing signal in response to the first reflectance level being below the predetermined reflectance level.

12. The method of claim 8 wherein the parameter of the first firing signal corresponds to a duration of the first firing signal.

13. The method of claim 12, the modification of the parameter further comprising:

increasing with the controller the duration of the first firing signal in response to the first reflectance level being above the predetermined reflectance level.

14. The method of claim 12, the modification of the parameter further comprising:

decreasing with the controller the amplitude of the first firing signal in response to the first reflectance level being below the predetermined reflectance level.

15. An inkjet printer comprising:

at least one printhead configured to form printed patterns on an image receiving surface;

an optical sensor configured to generate scanned image data of printed patterns on the image receiving surface; and a controller operatively connected to the at least one printhead, the optical scanner, and a memory, the controller being configured to:

identify a first halftone level corresponding to a contone level for a first ink drop parameter with reference to at least one mapping between a plurality of contone levels and a first plurality of halftone levels corresponding to the first ink drop parameter stored in the memory;

operate the at least one printhead to eject ink drops with the first ink drop parameter to form a printed pattern on the image receiving surface, the at least one printhead being operated with reference to the first halftone level to form the printed pattern corresponding to the contone level;

generate first scanned image data corresponding to the printed pattern on the image receiving surface with the optical sensor;

identify a first reflectance level of the printed pattern in the first scanned image data;

modify the first halftone level in the at least one mapping in response to the first reflectance level being different than a predetermined reflectance level stored in the memory in association with the contone level; and store the modified first halftone level in the at least one mapping in the memory to enable printing of halftone patterns with the predetermined reflectance level.

16. The inkjet printer of claim 15 wherein the first ink drop parameter corresponds to a first ink drop mass and the second ink drop parameter corresponds to a second ink drop mass.

17. The inkjet printer of claim 15 wherein the first ink drop parameter corresponds to a first ink colorant concentration and the second ink drop parameter corresponds to a second ink colorant concentration.

18. The inkjet printer of claim 15, the controller being further configured to:

increase the first halftone level in response to the first reflectance level being above the predetermined reflectance level.

19. The inkjet printer of claim 15, the controller being further configured to:

decrease the first halftone level in response to the first reflectance level being below the predetermined reflectance level.

* * * * *